I. A. MINNICK.
PIPE SUPPORT.
APPLICATION FILED NOV. 17, 1910.
991,736.
Patented May 9, 1911.
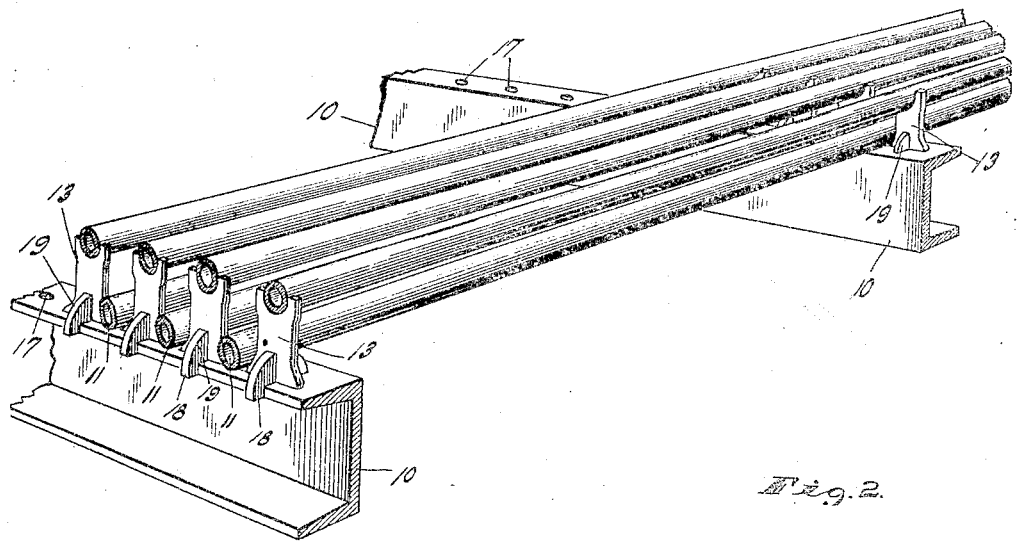
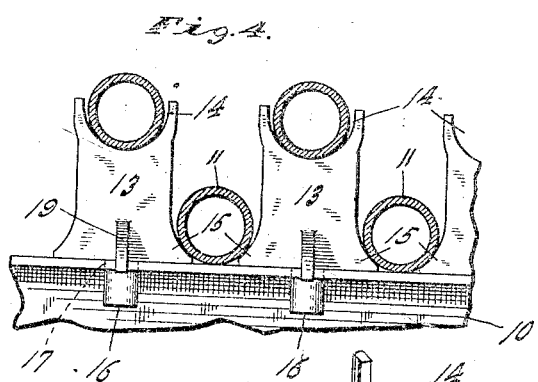
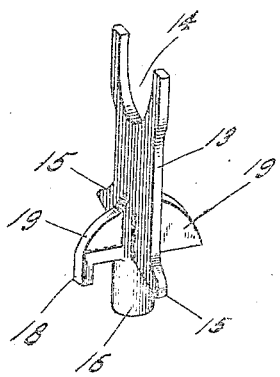
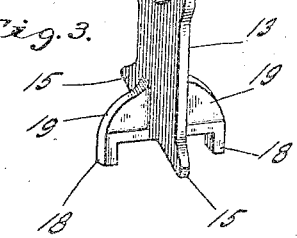
Witnesses
Inventor
Ira A. Minnick,
by Bradford & Hood
Attorneys

UNITED STATES PATENT OFFICE.

IRA A. MINNICK, OF INDIANAPOLIS, INDIANA, ASSIGNOR TO THE NATIONAL DRY KILN COMPANY, OF INDIANAPOLIS, INDIANA, A CORPORATION OF INDIANA.

PIPE-SUPPORT.

991,736.   Specification of Letters Patent.   Patented May 9, 1911.

Application filed November 17, 1910. Serial No. 592,860.

*To all whom it may concern:*

Be it known that I, IRA A. MINNICK, a citizen of the United States, residing at Indianapolis, in the county of Marion and State of Indiana, have invented a new and useful Pipe-Support, of which the following is a specification.

The object of my invention is to produce a device by means of which two series of pipes alternately placed, may be supported at different levels in such manner that any pipe of either series may be readily removed without disturbing the adjacent pipes of the other series.

The accompanying drawings illustrate my invention.

Figure 1 is a perspective view of my improved pipe support with two series of pipes in position, but with the near ends omitted in order to show the support more clearly; Fig. 2 a perspective view of one of the supports; Fig. 3 a perspective of a slightly modified form; and Fig. 4 a front elevation of the parts shown in Fig. 1.

In the drawings, 10 indicates a supporting beam or frame which, in practice, may be conveniently made from an ordinary commercial channel iron which will form the direct support for the lower series of pipes 11. Mounted upon beam 10 between each two adjacent pipes 11, is an individual pipe supporting standard 13 in the upper end of which is formed a pipe receiving pocket 14. At the lower end standard 13 is laterally extended at 15, 15 so as to form a pair of oppositely extending wings which project under and engage the pipes 11 although preferably this projection is of such character that the weight of the pipes will not rest upon the projecting wings. The base of the pipe supporting standard 13 will be so formed as to rest firmly upon the upper face of the beam 10 and it is desirable that some means be provided to keep the standard in place upon the beam. For this purpose, I provide each standard, at its middle with a depending pin 16 which is adapted to enter a properly placed perforation 17 which is formed through the upper web of the beam 10. In order to prevent the standards from turning while the pipes are being placed, I also provide each standard with a depending finger 18 so placed with relation to pin 16 as to just drop over the edge of the beam 10. If desired, only the end standards 13 need be provided with the depending pins 16 and the intermediate ones may be formed as shown in Fig. 3, the depending fingers 16 being omitted and the base of the standard being of a width equal to the width of the upper face of the beam 10 and being provided with two of the fingers 18, one to lie upon each side of the beam. These standards can be made of very light cast iron, or otherwise, if desired, the construction shown in the drawings being probably preferable.

It will be noticed that the standard consists of a thin main plate or web with which the wings 15 are integrally formed and that stability in the other direction is obtained by laterally extending wings 19, 19 which carry the fingers 18 and lie substantially parallel with the pipes. It will also be noticed that the main body of the standard is somewhat narrowed below the upper pipe pocket so that, while the standards may be placed so close together that the space between the upper ends of the pockets will be substantially equal to or perhaps a little less than the diameter of the pipes 11, yet said pipes may be readily introduced between the narrowed portions by slight tilting of adjacent standards, this construction facilitating assembly and withdrawal of the pipes.

The device is especially designed for use in erection of piping for dry kilns and it will be noticed that any pipe of the lower series may be readily withdrawn without disturbing the pipes of the upper series.

I claim as my invention:

A pipe support comprising a main supporting body, and a plurality of individual pipe standards detachably mounted in spaced relation upon said main support, each of said standards having a pipe socket in its upper end and each provided at its lower end with laterally extending wings which pass into the space between the main support and pipes mounted on said main support at each side of the standard thereby preventing tilting of each individual support by engagement with the pipes mounted on the main support, each of said standards having a depending pin formed to enter a perforation formed in the main support.

In witness whereof, I have hereunto set my hand and seal at Indianapolis, Indiana, this ninth day of November, A. D. one thousand nine hundred and ten.

IRA A. MINNICK. [L. S.]

Witnesses:
 ARTHUR M. HOOD,
 FRANK A. FAHLE.